US007259764B2

(12) United States Patent
Anderson

(10) Patent No.: US 7,259,764 B2
(45) Date of Patent: Aug. 21, 2007

(54) DEFROBULATED ANGLES FOR CHARACTER JOINT REPRESENTATION

(75) Inventor: John Anderson, San Anselmo, CA (US)

(73) Assignee: Pixar, Emeryville, CA (US)

(*) Notice: Subject to any disclaimer, the term of this patent is extended or adjusted under 35 U.S.C. 154(b) by 392 days.

(21) Appl. No.: 10/844,049

(22) Filed: May 11, 2004

(65) Prior Publication Data

US 2004/0263518 A1 Dec. 30, 2004

Related U.S. Application Data

(60) Provisional application No. 60/470,767, filed on May 14, 2003, provisional application No. 60/470,590, filed on May 14, 2003.

(51) Int. Cl.
G06T 15/70 (2006.01)
G06T 13/00 (2006.01)

(52) U.S. Cl. ...................... 345/473; 345/474; 345/475

(58) Field of Classification Search .................. 345/473
See application file for complete search history.

(56) References Cited

U.S. PATENT DOCUMENTS

| 5,692,117 | A | 11/1997 | Berend et al. |
| 5,877,778 | A | 3/1999 | Dow et al. |
| 6,323,895 | B1 | 11/2001 | Sata |
| 6,535,215 | B1 | 3/2003 | DeWitt et al. |
| 2006/0061574 | A1* | 3/2006 | Ng-Thow-Hing et al. .. 345/473 |

OTHER PUBLICATIONS

Maurel, Walter, et al., "Human Shoulder Modeling Including Scapulo-Thoracic Constraint and Joint Sinus Cones," Computers and Graphics vol. 24, No. 2 (2000), pp. 203-218.*
Wilhelms, Jane, et al., "Efficient Spherical Joint Limits With Reach Cones", Apr. 17, 2001, University of California, Santa Cruz, CA, U.S.A., .1-13.*
Wilhelms, Jane, et al., "Fast and Easy Reach-Cone Joint Limits", vol. 6, No. 2 (2001), pp. 27-41, A.K. Peters Ltd.*
Shoemake, Ken, "Animation Rotation with Quatemion Curves", In Proceedings Computer Graphics, SIGGRAPH 1985, vol. 19, No. 3, ACM 1985, pp. 245-254.*
Kry, Paul G. et al.; "EigenSkin: Real Time Large Deformation Character Skinning in Hardware"; *University of British Columbia*, 7 pages, 2002.
Lewis, J.P. et al.; "Pose Space Deformation: A Unified Approach to Shape Interpolation and Skeleton-Driven Deformation"; *Centropolis*, pp. 165-172, 2000.
Wang, Xiaohuan C. et al.; "Multi-Weight Enveloping: Least-Squares Approximation Techniques for Skin Animation"; *Industrial Light & Magic*, pp. 129-138, 2002.

* cited by examiner

*Primary Examiner*—Ulka J. Chauhan
*Assistant Examiner*—Roberta Prendergast
(74) *Attorney, Agent, or Firm*—Law Office of Jonathan Hollander PC

(57) ABSTRACT

The present invention includes a method and apparatus for representing joint rotations of character models that eliminates the artifacts imposed by the ambiguities inherent in four angle rotations. An embodiment of the invention transforms joint angles from their original four angle representations into a set of defrobulated angles that provides the least confusion between position and twist information. Manipulating the character model using the set of defrobulated angles eliminates the angular discontinuities responsible visual "popping" and other visual discontinuities. In an embodiment, an animator specifies a pose using joint angles in their four angle Euler form. The joint angles of the pose is transformed to the defrobulated form. The defrobulated joint angles are weighted and applied to the points of the character model. The weighted sum of the defrobulated angles for each point are then converted back to an Euler angle form to pose the point.

17 Claims, 8 Drawing Sheets

DEFROBULATED ANGLES FOR CHARACTER JOINT REPRESENTATION

CROSS-REFERENCES TO RELATED APPLICATIONS

This application claims priority to and incorporates by reference for all purposes U.S. Provisional Patent Applications Ser. No. 60/470,590, "Rig Baking," and "Defrobulation," Ser. No. 60/470,767, both filed May 14, 2003. This application further incorporates by reference for all purposes U.S. patent application Ser. No. 10/844,048, "Rig Baking," filed May 11, 2004.

BACKGROUND OF THE INVENTION

The present invention relates to the field of computer graphics, and in particular to methods and apparatus for animating computer generated characters. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, a character's appearance is defined by a three-dimensional computer model. To appear realistic, the computer model of a character is often extremely complex, having millions of surface elements and hundreds or thousands of attributes. Due to the complexity involved with animating such complex models, animation tools often rely on armatures and animation variables to define character animation. An armature is a "stick figure" representing the character's pose, or bodily attitude. The armature is controlled by animation variables, which are parameters used by a function to modify the character model. By changing the value of animation variables, the armature can be manipulated into a desired pose. As the armature is posed by the animator, the animation tools modify character model so that the bodily attitude of the character roughly mirrors that of the armature.

Animation variables and their associated functions are used to abstract complicated modifications to a character model to a relatively simple control. One type of animation variable specifies the rotation angles of the joints in the armature of a character model. Armature joints may have one or more axes of rotation, depending upon the type of armature joint. For example, a ball and socket joint, as found in the shoulder and hip joints of armatures for humanoid characters, will have three axes of rotation.

Because of problems related to joint gimbal lock, which is when one axis of rotation is rotated to the same direction as a second axis of rotation, a prior approach over-specifies three-dimensional rotations with four rotation angles rather than the minimum of three angles. For example a three-dimensional rotation may be represented by consecutive rotations around the x, z, and y axes, and then a fourth rotation around the x axis. This four angle representation of a three-dimensional rotation is referred to as a set of extended Euler angles. In another example, a three-dimensional rotation can be represented using three rotation angles and a fourth "hint" angle that specifies the intended final position of the joint after rotation. In general, a set of angles that includes one or more redundant angles is referred to as a set of extended angles.

The use of the redundant rotation angles, such as the additional x-axis rotation or a hint angle in the examples above, insures that it is always possible to make a desired rotation from one joint orientation to another joint orientation without large changes in one of the rotation angles. The use of an extra rotation angles enable any three-dimensional rotation, and hence any character pose, to be specified with many different sets of extended angle values.

The ambiguity created from representing the same poses with different sets of angle values does not present a problem for rigidly rotating objects. However, character models are often not rigidly rotating objects. In articulated characters, the points of the character model, such as skin or control points defining the surface of the character model, are often weighted by the rotation angles of nearby armature joints. Applying weights to joint rotations smoothly distributes the rotation over the points of the character model. Because of the ambiguity inherent in a angle rotations, the position of points on a character model depends not only on the final position of the joint but also on the particular set of extended angles selected by the animator to create the pose.

Thus, some of the set of extended angles defining a given pose will result in a visually displeasing or awkward appearance. Moreover, as the character model is animated using some animation techniques, discontinuous "popping," or abrupt changes in the appearance of the character model, will occur. For example, when inverse kinematic (IK) solvers are used to determine all or a portion of a character's pose, discontinuous popping will occur as the solvers switch between pose solutions defined by drastically different sets of extended angles.

It is therefore desirable for a system and method of expressing joint angles to avoid gimbal lock and to give character models a consistent appearance regardless of the set of joint angles used to define a given pose. Furthermore, it is desirable to be able to animate the character model without introducing visual discontinuities. It is also desirable that the system and method of expressing joint angles allows for the use of inverse kinematics and other algorithms to determine the pose and appearance of the articulated model.

BRIEF SUMMARY OF THE INVENTION

The present invention includes a method and apparatus for representing joint rotations of character models that eliminates the artifacts imposed by the ambiguities inherent in four angle rotations. An embodiment of the invention transforms joint angles from their original four angle representations into a set of three defrobulated angles that provides the least confusion between position and twist information. Manipulating the character model using the set of defrobulated angles eliminates the angular discontinuities responsible visual "popping" and other visual discontinuities. In an embodiment, an animator specifies a pose using joint angles in their four angle extended form. The joint angles of the pose is transformed to the defrobulated form. The defrobulated joint angles are weighted and applied to the points of the character model. The weighted sum of the defrobulated angles for each point are then converted back to a four extended angle form to pose the point.

In an embodiment, a method of determining a position of a point of an articulated character model according to a pose includes determining a set of joint angles defined by the pose. The set of joint angles represent a sequence of rotations around a set of axes of a joint associated with the articulated character model. The embodiment transforms the set of joint angles into a set of defrobulated angles. The set of defrobulated angles have one angular discontinuity shifted outside of a normal range of motion for the joint. The embodiment applies a set of joint angle weights associated with the point to the set of defrobulated angles to determine a weighted set of defrobulated angles and transforms the weighted set of defrobulated angles to a weighted set of joint angles. The weighted set of joint angles represent a sequence of weighted rotations around the set of axes of the joint associated with the articulated character model. The embodiment rotates the point according to the sequence of weighted rotations represented by the weighted set of joint angles.

In another embodiment, the pose is computed from an inverse kinematic solver. In yet another embodiment, the set of defrobulated angles includes three angles. In still another embodiment, the set of defrobulated angles includes an essential twist angle describing the rotation of an armature segment of the articulated character model relative to a reference twist angle defined to be continuous over the normal range of motion for the joint. In an embodiment, the point is a skin point or alternately a control point of the articulated character model.

An additional embodiment transforms the set of joint angles into the set of defrobulated angles by determining a set of projections along the set of axes of a unit vector rotated by the set of joint angles, determining a chord angle from the set of projections, and determining the set of defrobulated angles from the set of joint angles, the set of projections, and the chord angle.

BRIEF DESCRIPTION OF THE DRAWINGS

The invention will be described with reference to the drawings, in which.

In the drawings, like reference numbers in different figures correspond with like elements.

DETAILED DESCRIPTION OF THE INVENTION

Figure 1:
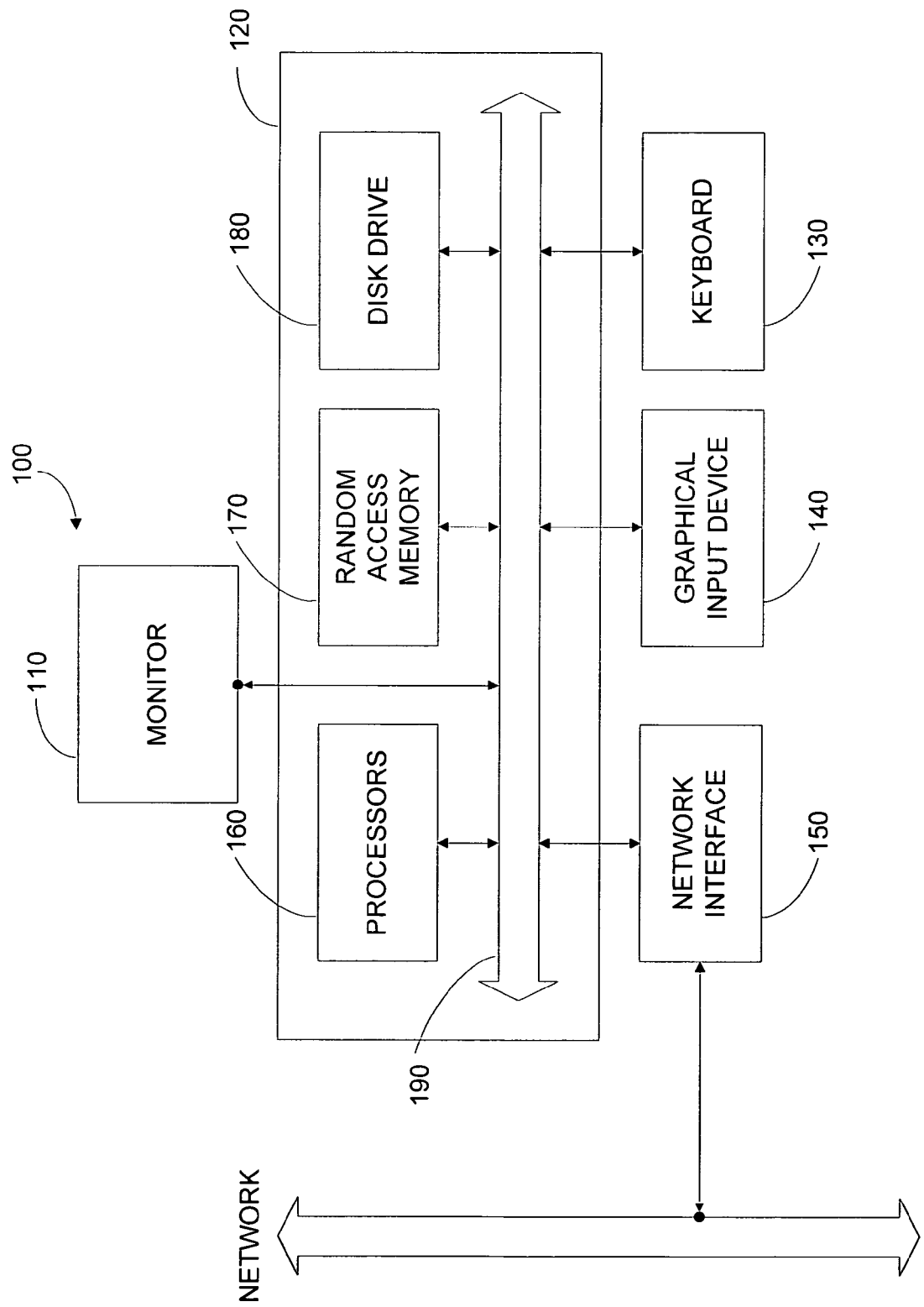
FIG. 1 illustrates a block diagram of a computer system suitable for implementing an embodiment of the invention.

FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
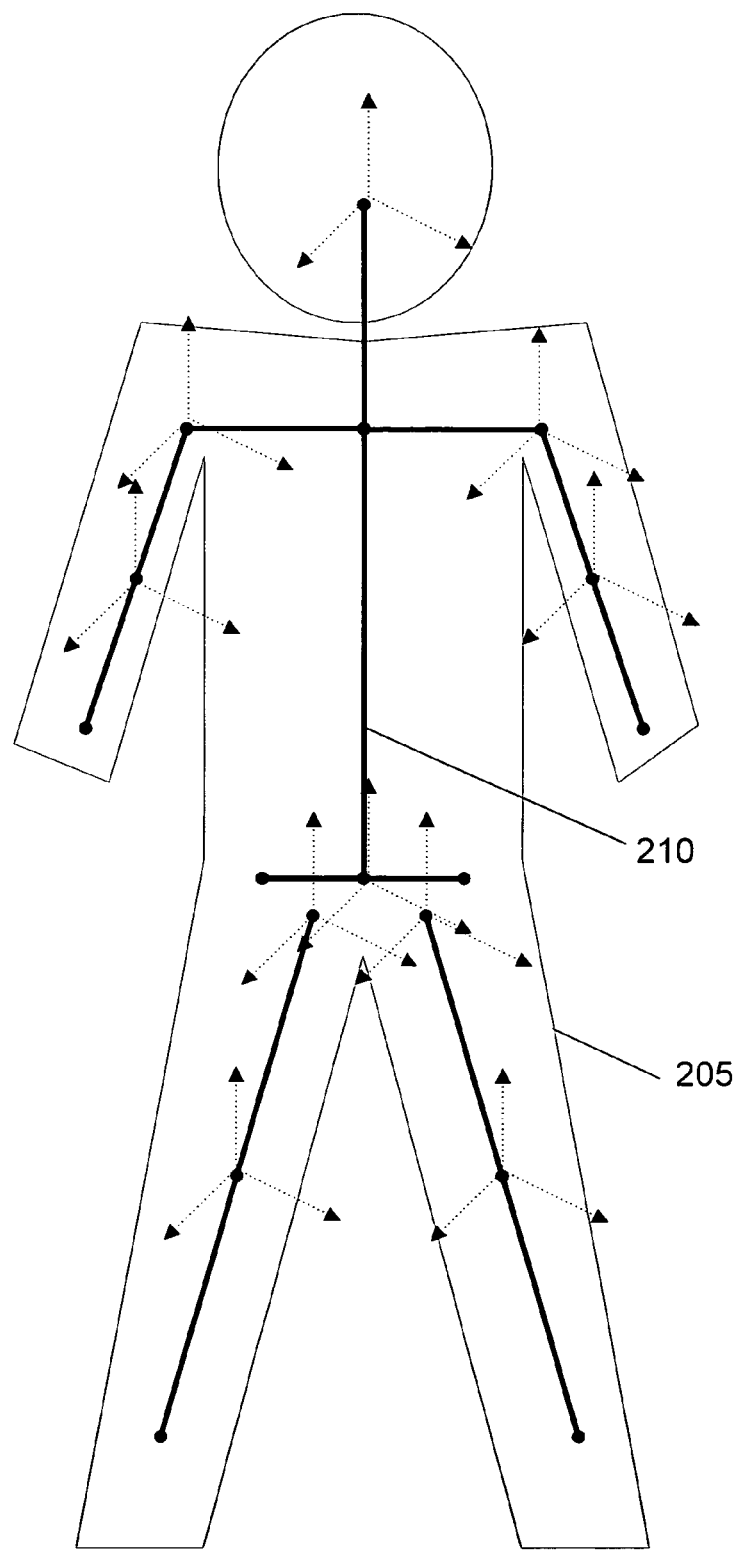
FIG. 2A illustrates an example of an articulated character model having an armature used for posing the articulated character model.
Figure 2B:
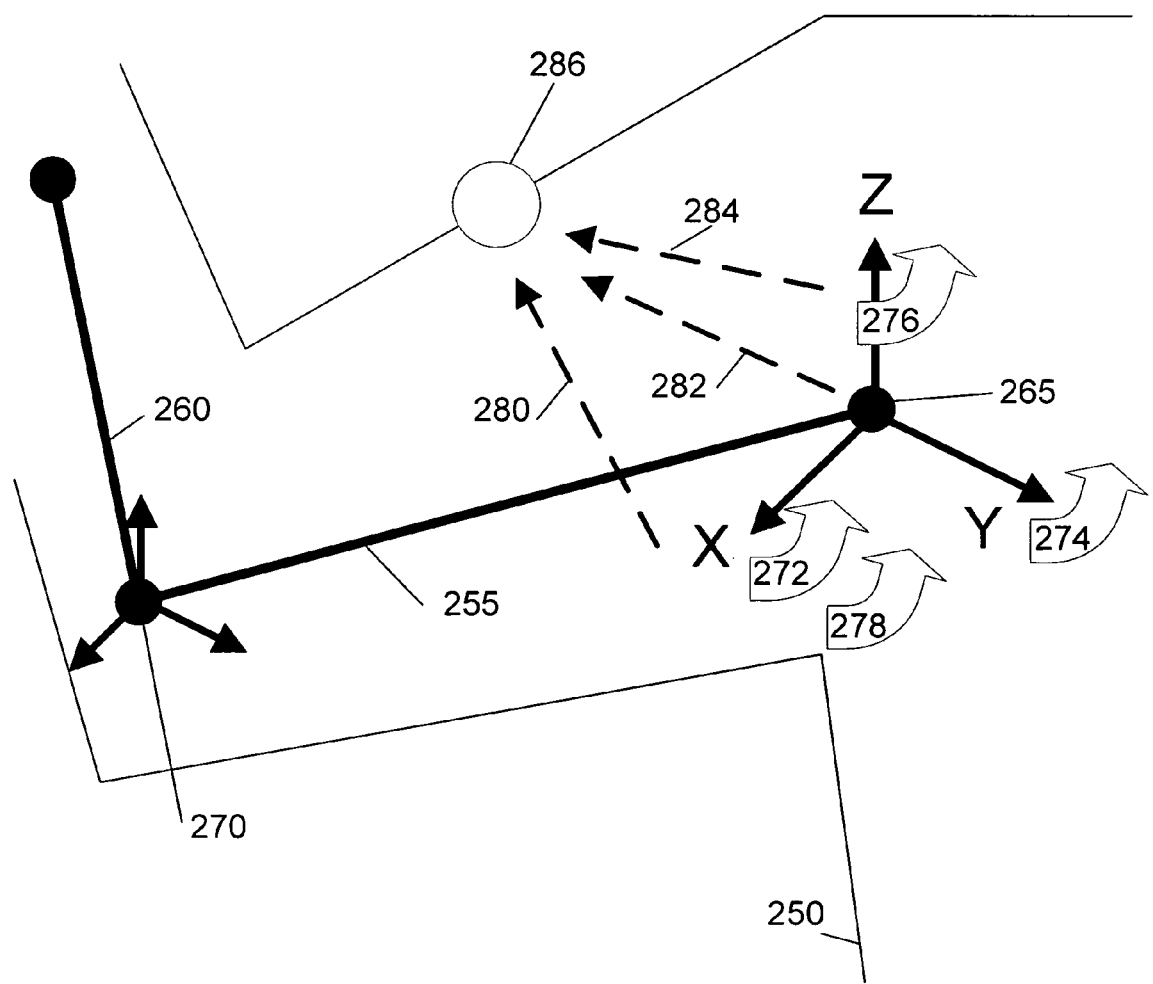
FIG. 2B illustrates the determination of the position of a point of an articulated model for an example armature pose.

FIGS. 2A and 2B illustrate an example character and an example armature used for posing the example character. Character 205 is a three-dimensional computer model of an object, shown in two dimensions for clarity. Although character 205 is shown to be humanoid in shape, character 205 may take the form of any sort of object, including plants, animals, and inanimate objects with realistic and/or anthropomorphic attributes. Character 205 can be created in any manner used to create three-dimensional computer models, including manual construction within three-dimensional modeling software, procedural object creation, and three-dimensional scanning of physical objects. Character 205 can be comprised of a set of polygons; voxels; higher-order curved surfaces, such as Bezier surfaces or non-uniform rational B-splines (NURBS); constructive solid geometry; and/or any other technique for representing three-dimensional objects. Additionally, character 205 can include attributes defining the outward appearance of the object, including color, textures, material properties, transparency, reflectivity, illumination and shading attributes, displacement maps, and bump maps.

Character 205 is animated through armature 210. Armature 210 includes one or more armature segments. As shown in FIG. 2A, the armature segments can be connected with or separated from adjacent armature segments. Animators manipulate the position and orientation of the segments of armature 210 to define a pose for the character. A pose is a set of armature positions and orientations defining the bodily attitude of character 205. Armature segments can be constrained in size, position, or orientation, or can be freely manipulated by the animator. The number of armature segments can vary according to the complexity of the character, and a typical character can have an armature with hundreds or thousands of segments. In some cases, the number and position of armature segments is similar to that of a "skeleton" for a character; however, armature segments can also define subtle facial expressions and other character details not necessarily associated with bones or other anatomical features. Additionally, although the armature segments in the armature 210 of FIG. 2A are comprised of a set of points, in alternate embodiments of the invention the armature segments can be comprised of a set of surfaces and/or a set of volumes. As the armature 210 is posed by the animator, the bodily attitude of character 205 roughly mirrors that of the armature 210.

Character 205 is animated by creating a sequence of frames, or still images, in which the character 205 is progressively moved from one pose to another. Character 205 can also be translated, rotated, scaled, or otherwise manipulated as a whole between frames. Animators can manually create the poses of a character for each frame in the sequence, or create poses for two or more key frames, which are then interpolated by animation software to create the poses for each frame. Poses can also be created automatically created using functions, procedures, or algorithms.

Whether all or a portion of a pose is created manually by an animator or automatically using a function, procedure, or algorithm, the pose of character can be defined by a set of animation variables. Animation variables and their associated functions are used to abstract complicated modifications to a character model to a relatively simple control. One type of animation variable specifies the rotation angles of an armature segment around an origin, referred to as a joint. Armature joints may have one or more axes of rotation, depending upon the desired number of degrees of freedom for the associated armature segment. For example, armature segments corresponding with the upper arm and leg of a humanoid character model will be associated with shoulder and hip joints, respectively, having three axes of rotation.

FIG. 2B illustrates the determination of the position of a point of an articulated model for an example armature pose. FIG. 2B illustrates a portion 250 of a character model showing the shoulder and arm region in an example pose. Armature segments 255 and 260, representing the upper and lower arm, respectively, are used to pose the portion 250 of a character model. Armature segment 255 is associated with joint 265. The position of armature segment 255 is determined from a rotation around joint 265. Similarly, the position of armature segment 260 is determined from a rotation around joint 270. In an embodiment, joints may be attached to armature segments, so that the movement of the armature segment moves the joint as well. For example, joint 270 may be attached to the end of armature segment 255, such that the position of joint 270 remains at the end of armature segment 255 regardless of the orientation of armature segment 255.

Because of problems related to joint gimbal lock, which is when one axis of rotation is rotated to the same direction as a second axis of rotation, the three-dimensional rotation of an armature segment can be over-specified with four rotation angles rather than the minimum of three angles. For example, the rotation of armature segment 255 around joint 265 can be specified as consecutive rotations around the x, z, and y axes, and then a fourth rotation around the x axis. This set of rotation angles can be expressed as animation variables 272, 274, 276, and 278.

The surface of the portion 250 of a character model is defined by one or more skin or control points, such as skin point 286. To determine the surface of the portion 250 of character model, the animation variables or rotations of an adjacent joint are weighted and applied to skin or control points. Applying weights to joint rotations smoothly distributes the rotation over the surface of the character model. For each skin or control point, different weight values may be applied to each of the axes of rotation of a joint, and rotations from several joints can be applied to a skin or control point. In an example, for skin point 286, a weight of 0.5 might be applied to rotation angle 272, and a weight of 0.75 applied to rotation angles 274, 276, and 278. The weighted rotation angles 280, 282, and 284 are applied to skin point 286 to determine its posed position.

Over-specifying three-dimensional rotations using four or more rotation angles introduces ambiguity in that a single armature segment orientation can be represented by several different sets of rotations angles. However, because different weight values may be applied to each rotation axis when determining the position of skin or control points, the position of weighted points on a character model depends not only on the final position of the joint but also on the particular set of extended angles selected by the animator to create the pose.

Thus, some of the sets of four angles defining a given pose will result in a visually displeasing or awkward appearance. Moreover, as the character model is animated by changing the joint angles, discontinuous "popping," or abrupt changes in the appearance of the character model, will occur. For example, when inverse kinematic (IK) solvers are used to determine all or a portion of a character's pose, discontinuous popping will occur as the solvers switch between pose solutions defined by drastically different sets of extended angles.

Figure 3:
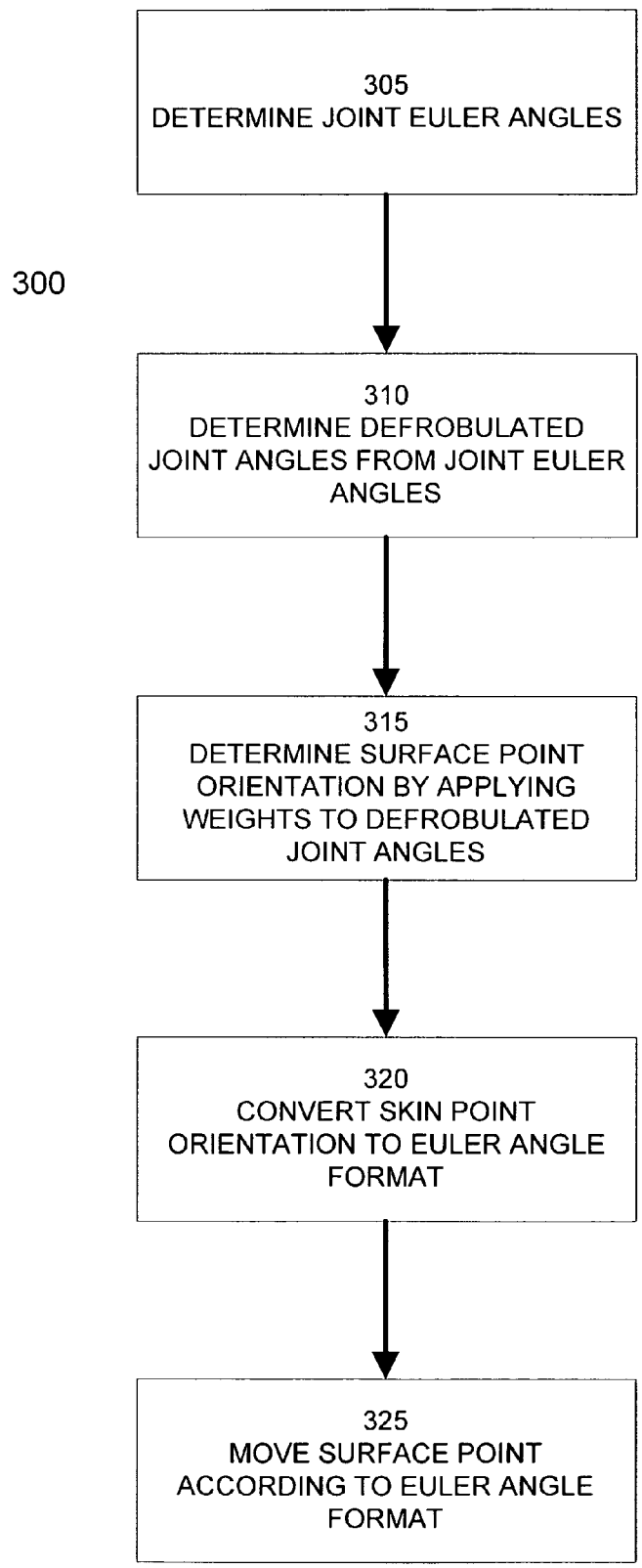
FIG. 3 illustrates a method for determining the position of a point of an articulated model for an embodiment of the invention.

An embodiment of the invention avoids gimbal lock, gives character models a consistent appearance regardless of the set of extended angles used to define a given pose, animates character models using both manual and algorithmic methods, for example inverse kinematics, without introducing visual discontinuities. FIG. 3 illustrates a method 300 for determining the position of a point of an articulated character model for an embodiment of the invention.

At step 305, a set of extended angles are determined for one or more joints of a character armature. In an embodiment, the set of extended angles are set manually by an animator specifying the value of one or more animation variables. In another embodiment, an algorithmic method such as inverse kinematics is used to specify the set of extended angles for one or more joints of the character armature.

At step 310, the set of extended angles are transformed from a set of four angles into a set of "defrobulated" angles. The set of defrobulated angles always appear smooth over the normal range of armature segment motion. Poles, or regions of angular discontinuities, are shifted outside the normal range of armature segment motion. For example, the poles of a set of defrobulated angles corresponding with a typical shoulder joint will be located outside the range of motion of the upper arm armature segment.

Typically, the orientation of an armature segment around a joint includes a "twist" component, which defines the rotation, or twist, of an armature segment around its major axis, and a position component, which specifies the displacement of points on the armature segment from a rest position. When expressed using a set of extended angles, the twist and positional components are fused together. Transitioning between alternative expressions of the same or similar joint positions, for example two different sets of extended angles that define the same joint position, introduces abrupt visual "popping." These transitions are common when using automated animation techniques, such as inverse kinematic (IK) solvers, to determine all or a portion of a character's pose. For example, discontinuous popping will occur as an IK solver switches between pose solutions specifying the same or similar joint positions, but defined by drastically different sets of extended angles. In contrast, the set of defrobulated angles separates the twist and positional components, eliminating the angular discontinuities and the associated popping artifacts with the range of armature segment motion.

The set of defrobulated angles are associated with a reference twist angle, which is the "untwisted" orientation of the armature segment for any given position. In an embodiment, the set of defrobulated angles includes a pair of "position" angles defining the displacement of points on an armature segment from a rest position, without any twisting. The set of defrobulated angles also include an essential twist angle specifying the "twist" of an armature segment relative to the reference twist angle. The reference twist angle is defined to appear smooth and continuous over the entire normal range of armature segment motion.

In an embodiment, the set of defrobulated angles are determined from the set of extended Euler angles as follows. Starting with a set of extended Euler angles (tw, a, b, c), corresponding to the right-handed angle rotation form (x, y, z, x), a unit vector can be located at the joint origin and orientated according to the last three angles (a, b, c). As the first rotation angle, tw, defines the twist of an armature segment aligned at rest along the x-axis, it can be dealt with later.

Figure 4A:
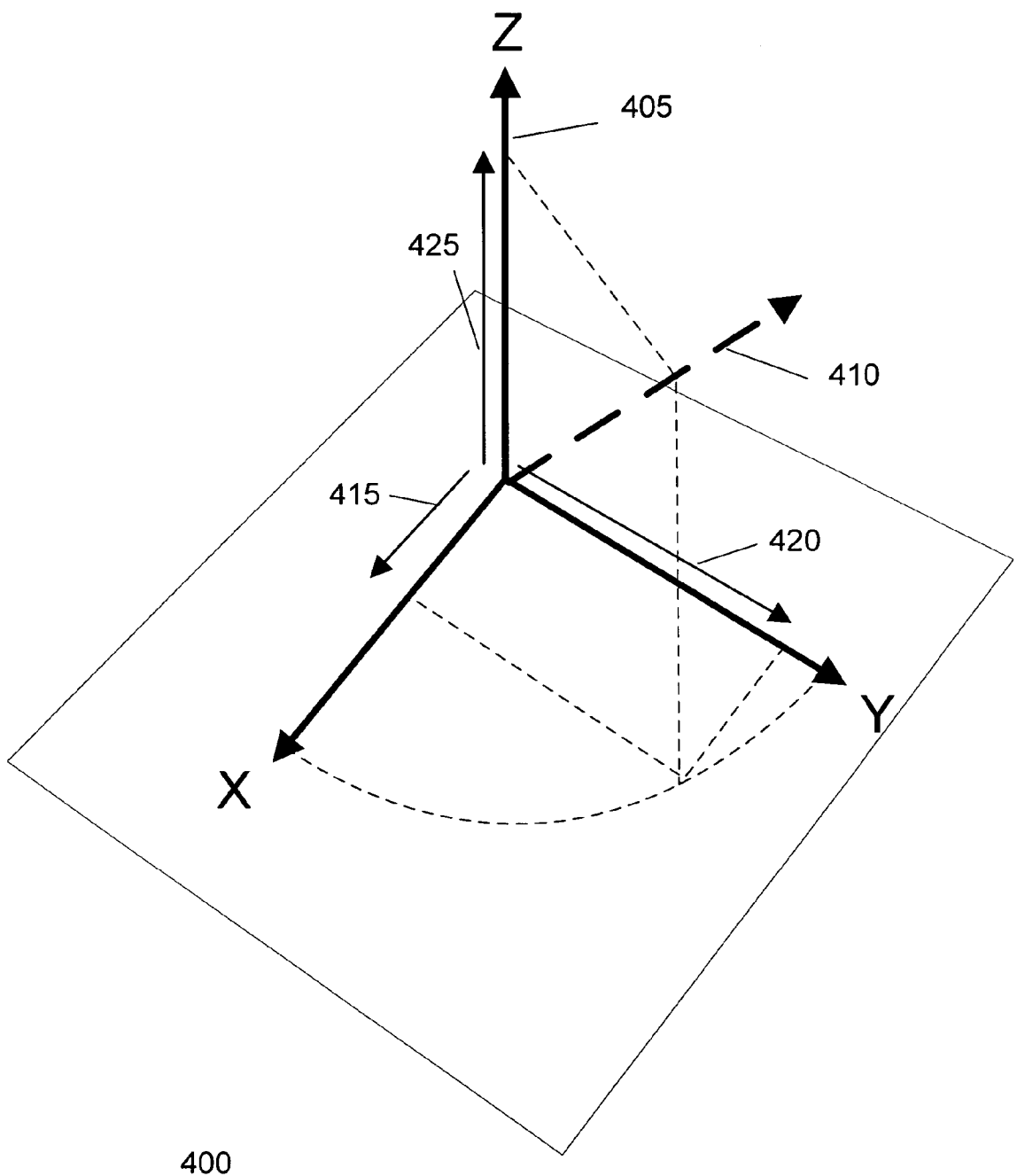
FIGS. 4A-4C illustrate the transformation of an example set of Euler joint angles to a set of defrobulated angles according to an embodiment of the invention.
Figure 4B:
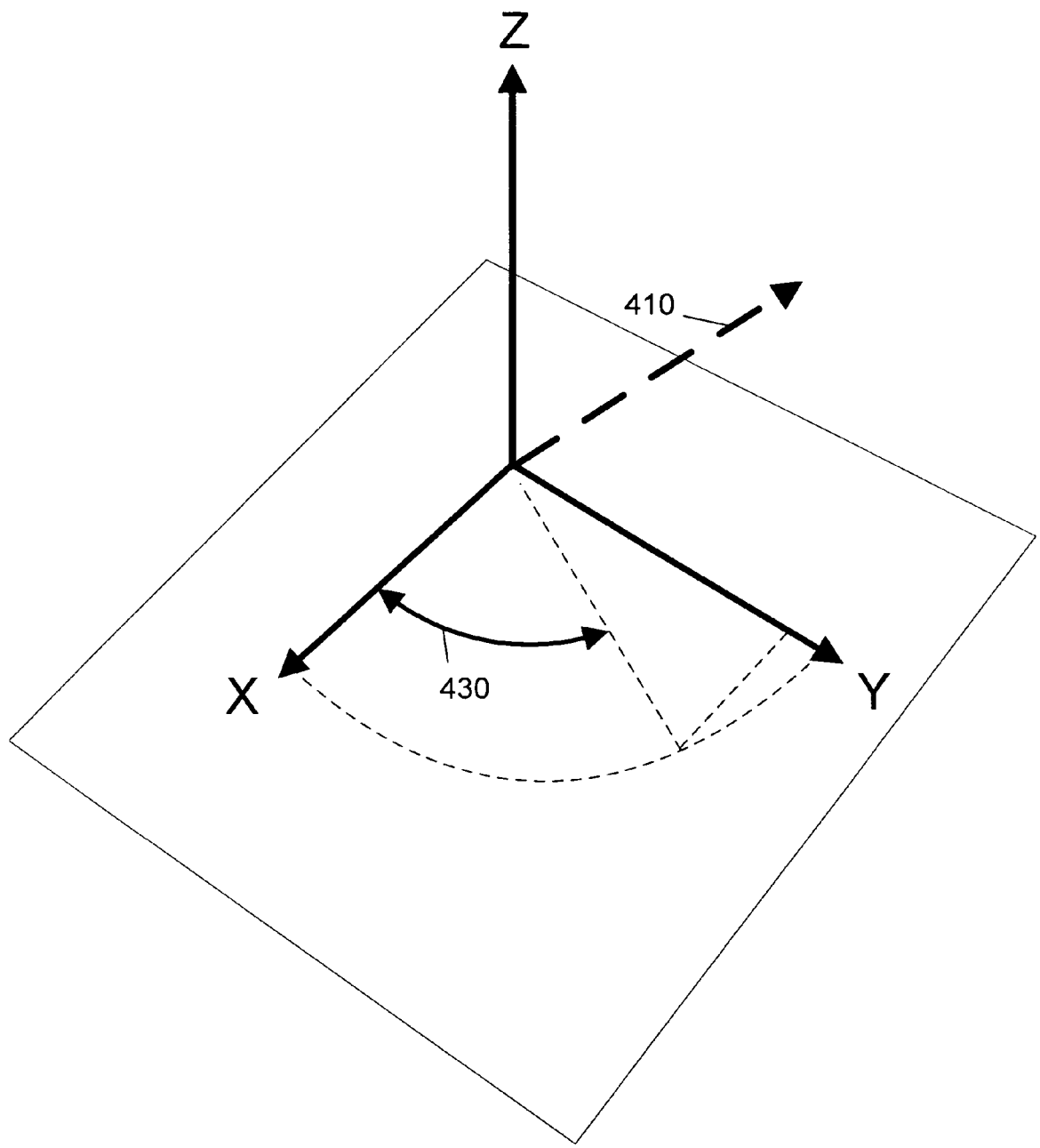
Figure 4C:
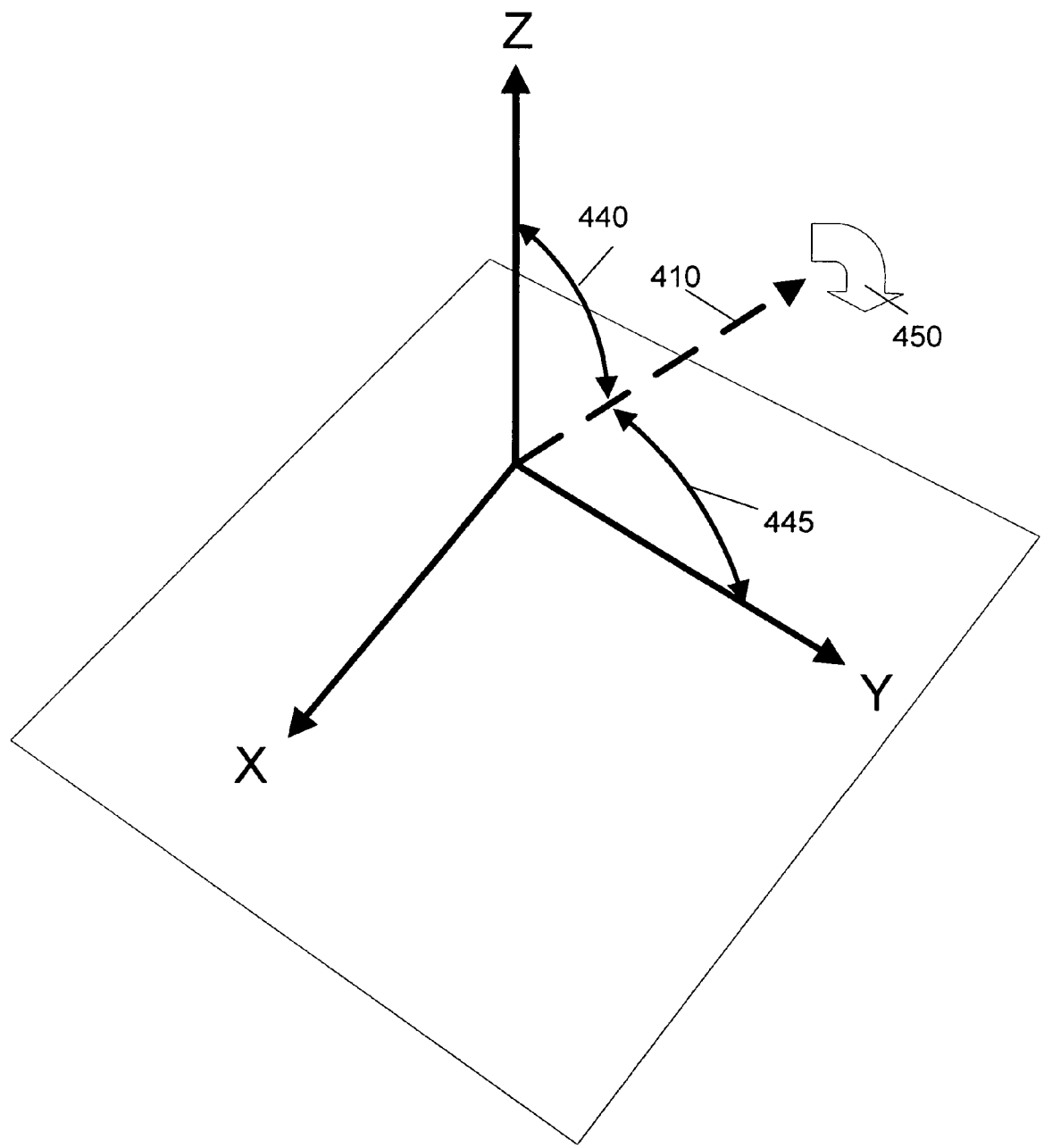

A set of projections of the unit vector along the x, y, and z axes, xp, yp, and zp respectively, is computed as xp=cos(a)cos(b); yp=cos(c)sin(a)+sin(c)sin(b)cos(a); and zp=sin(c)sin(a)−cos(c)sin(b)cos(a). FIGS. 4A-4C illustrate the transformation of an example set 400 of Euler joint angles to a set of defrobulated angles according to an embodiment of the invention. In FIG. 4A, a unit vector 410 is located at the origin of joint 405 and orientated according to angles (a, b, c), as described above. The projections of the unit vector 410 along the x, y, and z axes are xp, 415; yp, 420; and zp, 425.

From the set of projections of the unit vector along the x, y, and z axes, a chord angle, ch, is defined as ch=acos(xp). Continuing with the example of FIG. 4A, FIG. 4B shows the chord angle 430 corresponding with unit vector 410.

The chord angle ch is used as an intermediate value to determine a set of defrobulated angles (q, r, et). In an embodiment, q=ch*yp and r=ch*zp. The essential twist, et, is defined as:

$$et = tw + \arctan\left(\frac{zp}{yp}\right) + \arctan\left(\frac{\sin(b)}{\cos(b)\sin(a)}\right).$$

FIG. 4C illustrates the set of defrobulated angles corresponding with the unit vector 410. The set of defrobulated angles include "position" angles q, 445, and r, 440. The essential twist angle, et, 450 specifies the "twist" of the armature segment from the reference twist, as discussed above.

The above embodiment discusses one possible transformation from extended Euler angles to a defrobulated form. Alternate embodiments can use mathematically equivalent transformations. Further embodiments can be used to transform other types of sets of extended angles, such as a set of three angles and a hint angle, to a defrobulated form. Additional embodiments can transform any type of extended angle set to a defrobulated form useful for articulation. In general, the defrobulated angle format includes any set of angles aligned with the natural motion of a joint of a character model and its associated weighted distortion.

Following the determination of a set of defrobulated angles corresponding with the set of extended angles for a given joint orientation in step 310, step 315 determines the orientation of one or more surface points of the character model. In an embodiment, a set of weights are applied to the set of defrobulated angles to determine the orientation of one or more skin or control points defining the surface of the character model. In this step, the orientation of a skin or control points is expressed as a set of weighted defrobulated angles.

In one embodiment, the weighting of a skin or control point can be specified directly as set of three weights corresponding with the set of three defrobulated angles. Alternatively, the weighting of a skin or control point can be expressed as a set of extended weights corresponding with the set of extended angles. In this embodiment, the set of extended weights can be converted to a set of weights corresponding to the set of defrobulated angles. For example, a set of four weights corresponding with a set of four extended Euler angles can transformed to a set of three weights corresponding with the set of three defrobulated angles. In this example, the angle weight associated with the redundant fourth angle (c) is dropped. The weight associated with the twist angle (tw) is associated with the defrobulated essential twist. The remaining two weights associated with angles (a) and (b) are assigned to defrobulated angles (q) and (r), respectively.

As discussed above, applying weights to joint rotations smoothly distributes the rotation over the surface of the character model. In addition, by applying weights to the set of defrobulated angles, rather than the corresponding set of extended Euler angles, visual "popping" artifacts are eliminated and a consistent appearance is ensured.

In an embodiment, different weight values may be applied to each of the axes of rotation of the set of defrobulated angles. In a further embodiment, a set of defrobulated angles is determined for each joint in an armature, and the weighted rotations from several sets of defrobulated angles can be applied to a skin or control point.

Figure 5:
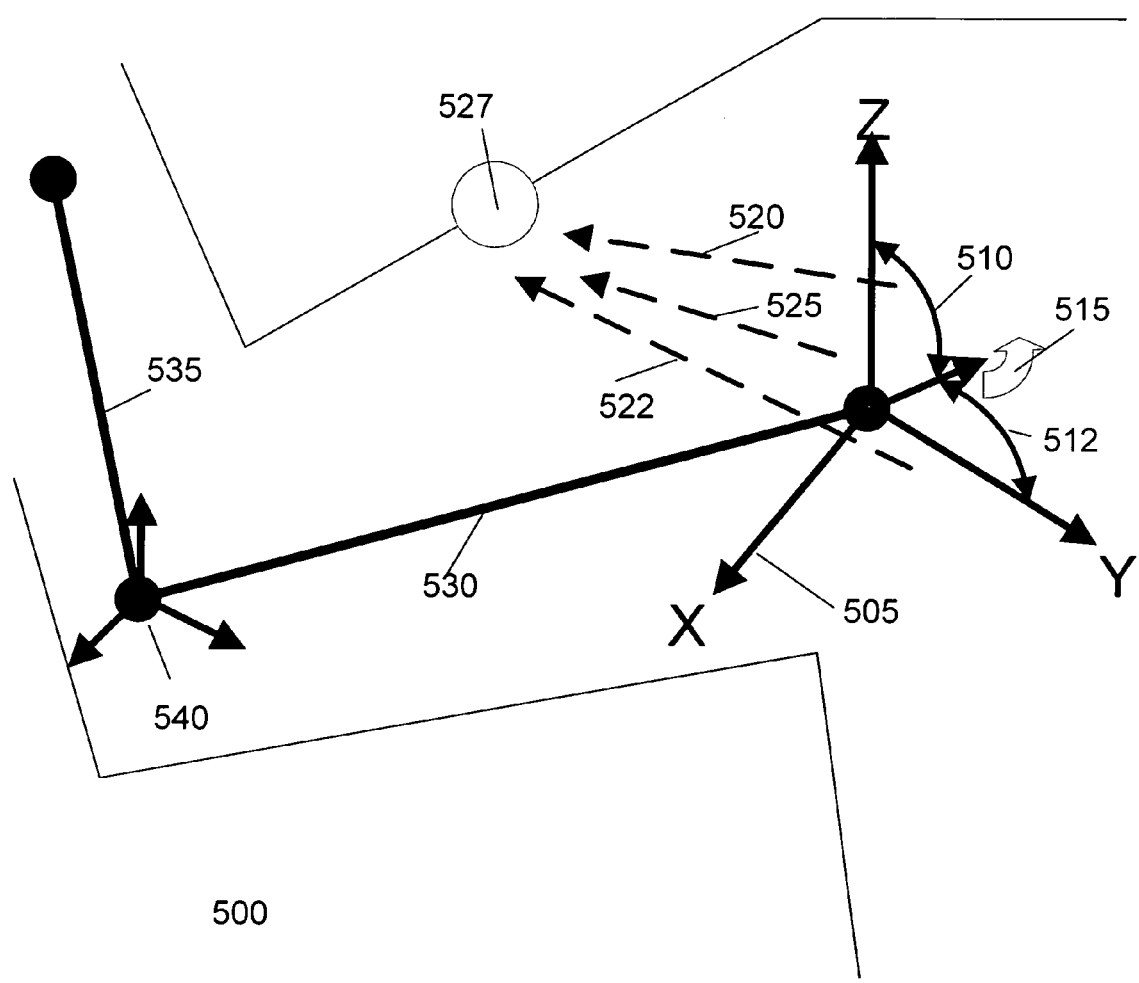
FIG. 5 illustrates the application of an example set of defrobulated angles to determine the position of a point of an example articulated model according to an embodiment of the invention.

FIG. 5 illustrates the application of an example set of defrobulated angles to determine the orientation of a point of an example articulated character model according to an embodiment of the invention. FIG. 5 illustrates a portion 500 of a character model showing the shoulder and arm region in an example pose. Armature segments 530 and 540, representing the upper and lower arm, respectively, are used to pose the portion 500 of a character model. Armature segment 530 is associated with joint 505, and similarly armature segment 535 is associated with joint 540. The positions of armature segments 530 and 535 are determined from rotations around their respective associated joints.

In FIG. 5, the position of armature segment 530 is determined by a set of defrobulated angles 510, 512, and 515 associated with joint 505. In an embodiment, the defrobulated angles 510, 512, and 515 are determined from a corresponding set of extended Euler angles as discussed above. To determine the position and orientation of point 527, which is a skin or control point used to define the surface of the character model, a set of angle weights 520, 522, and 525 are multiplied by the respective angles 510, 512, and 515 in the set of defrobulated angles. The result is a set of weighted defrobulated angles (q', r', et') defining the orientation of point 527.

Following the determination of the surface point orientation in step 315, the surface point is moved according to the rotations defined by the set of weighted defrobulated angles. In an embodiment, the set of weighted defrobulated angles is transformed back to a three angle Euler form to move the surface point. In this embodiment, step 320 transforms the set of weighted defrobulated angles, (q', r', et'), representing the orientation of the surface point to a three angle Euler form (tx, tz, tx2) as follows:

$$tx = \arctan\left(\frac{r}{q}\right)$$
$$tz = \sqrt{q^2 + r^2}$$
$$tx2 = et - tx$$

where tx is a first rotation around the x-axis, tz is a rotation around the z-axis, and tx2 is a second rotation around the x-axis.

At step 325, the point is positioned using a straightforward application of the three angle Euler form (tx, tz, tx2) corresponding with the set of weighted defrobulated angles. In an embodiment, the point is first rotated about the x-axis according to the value of tx. Next, the point is rotated about the z-axis according to the value of tz. Finally, the point is rotated again around the x-axis according to the value of tx2. At this point, the point is in a posed position as determined from the joint angles of the armature.

The transformation of surface points from their defrobulated form to an Euler angle form for positioning is done because Euler angles are a convenient way for positioning points. However, alternate embodiments can position surface points without transformation by rotating points around the defrobulated axes of rotation. Additionally, surface points can be transformed from defrobulated form to another angular representation, for example quaternions, for positioning.

It should be noted that once the posed character model has been created using one or more of the above discussed embodiments, any rendering technique, for example ray-tracing or scanline rendering, can create a final image or frame from the model in combination with lighting, shading, texture mapping, and any other image processing information.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

Thus, the present invention includes a method and apparatus for representing joint rotation angles of articulated characters used in computer animation that eliminates the artifacts imposed by the ambiguities inherent in four angle rotations. The transformation of joint angles from their original four angle representations into a set of three defrobulated angles is optimal in the sense that it provides the least confusion between position and twist information. This eliminates angular discontinuities that introduce visual "popping" and other visual discontinuities. It is therefore gives character models a consistent appearance regardless of the set of joint angles used to define a given pose. The consistent appearance of character models allows for the use of inverse kinematics and other algorithms without introducing visual discontinuities. Although the invention has been discussed with respect to specific embodiments thereof, these embodiments are merely illustrative, and not restrictive, of the invention. Thus, the scope of the invention is to be determined solely by the claims.

What is claimed is:

1. A method of determining a position of a point of an articulated character model according to a pose, the method comprising:
    determining a set of joint angles defined by the pose and representing a sequence of rotations around a set of axes of a joint associated with the articulated character model;
    transforming the set of joint angles into a set of defrobulated angles having an angular discontinuity shifted outside of a normal range of motion for the joint;
    applying a set of joint angle weights associated with the point to the set of defrobulated angles to determine a weighted set of defrobulated angles; and
    transforming the weighted set of defrobulated angles to a weighted set of joint angles representing a sequence of weighted rotations around the set of axes of the joint associated with the articulated character model; applying the weighted set of joint angles to the point; and outputting the point to a renderer adapted to generate at least a portion of an image.

2. The method of claim 1, further comprising:
    rotating the point according to the sequence of weighted rotations represented by the weighted set of joint angles.

3. The method of claim 1, wherein the pose is computed from an inverse kinematic solver.

4. The method of claim 1, wherein the set of defrobulated angles includes three angles.

5. The method of claim 1, wherein the set of defrobulated angles includes an essential twist angle describing the rotation of an armature segment of the articulated character model relative to a reference twist angle defined to be continuous over the normal range of motion for the joint.

6. The method of claim 1, wherein transforming the set of joint angles into the set of defrobulated angles includes determining a set of projections along the set of axes of a unit vector rotated by the set of joint angles, determining a chord angle from the set of projections, and determining the set of defrobulated angles from the set of joint angles, the set of projections, and the chord angle.

7. The method of claim 1, wherein the point is a skin point of the articulated character model.

8. The method of claim 1, wherein the point is a control point of the articulated character model.

9. A computer-readable storage medium having a plurality of computer-executable instructions adapted to direct an information processing device to perform an operation comprising:
    determining a set of joint angles defined by the pose and representing a sequence of rotations around a set of axes of a joint associated with the articulated character model;
    transforming the set of joint angles into a set of defrobulated angles having an angular discontinuity shifted outside of a normal range of motion for the joint;
    applying a set of joint angle weights associated with the point to the set of defrobulated angles to determine a weighted set of defrobulated angles; and transforming the weighted set of defrobulated angles to a weighted set of joint angles representing a sequence of weighted rotations around the set of axes of the joint associated with the articulated character model.

10. The computer-readable storage medium of claim 9, further comprising:
rotating the point according to the sequence of weighted rotations represented by the weighted set of joint angles.

11. The computer-readable storage medium of claim 9, wherein the pose is computed from an inverse kinematic solver.

12. The computer-readable storage medium of claim 9, wherein the set of defrobulated angles includes three angles.

13. The computer-readable storage medium of claim 9, wherein the set of defrobulated angles includes an essential twist angle describing the rotation of an armature segment of the articulated character model relative to a reference twist angle defined to be continuous over the normal range of motion for the joint.

14. The computer-readable storage medium of claim 9, wherein transforming the set of joint angles into the set of defrobulated angles includes determining a set of projections along the set of axes of a unit vector rotated by the set of joint angles, determining a chord angle from the set of projections, and determining the set of defrobulated angles from the set of joint angles, the set of projections, and the chord angle.

15. The computer-readable storage medium of claim 9, wherein the point is a skin point of the articulated character model.

16. The computer-readable storage medium of claim 9, wherein the point is a control point of the articulated character model.

17. A computer readable media including a first image having a character model in a first pose and a consecutive image having a character model in a second pose, wherein the appearance of the character model in the second pose is independent of the appearance of the character model in the first pose and wherein the character in the first and second poses are created according to the method of claim 1.

* * * * *